Figure 1:
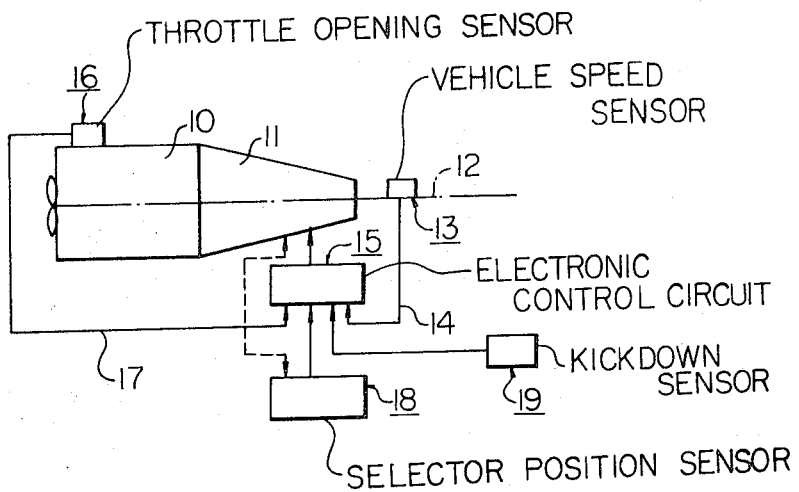

United States Patent [19]
Mizote

[11] 3,733,930
[45] May 22, 1973

[54] ELECTRONIC CONTROL DEVICE FOR AUTOMATIC POWER TRANSMISSION

[75] Inventor: Masanori Mizote, Kanagawa-ku, Yokohama, Japan

[73] Assignee: Nissan Motor Company Limited, Yokohama, Japan

[22] Filed: Apr. 12, 1971

[21] Appl. No.: 133,117

[30] Foreign Application Priority Data

Apr. 19, 1970 Japan ............................. 45/32937

[52] U.S. Cl. ................................................. 74/866
[51] Int. Cl. ............................................. B60k 21/02
[58] Field of Search .................................. 74/866

[56] References Cited

UNITED STATES PATENTS

| | | | |
|---|---|---|---|
| 2,995,949 | 8/1961 | Gelenius et al. | 74/866 |
| 3,052,134 | 9/1962 | Worster | 74/866 |
| 3,267,762 | 8/1966 | Reval | 74/866 X |
| 3,354,744 | 11/1967 | Kuhnle et al. | 74/866 X |
| 3,433,101 | 3/1969 | Scholl et al. | 74/866 |
| 3,439,564 | 4/1969 | Scholl et al. | 74/866 |
| 3,448,640 | 6/1969 | Nelson | 74/866 |
| 3,628,642 | 12/1971 | Ravenel | 74/866 X |

*Primary Examiner*—Charles J. Myhre
*Assistant Examiner*—Thomas C. Perry
*Attorney*—John Lezdey

[57] ABSTRACT

An electronic shift control device for an automatic power transmission causing the level of vehicle speed at which shifting takes place to change in dependence on driving conditions to prevent the engine from overspeeding or to increase the engine output torque for quick acceleration. Sensor sensing vehicle speed throttle valve position, position of a manual selector lever and a kick-down position of an accelerator pedal generate voltages which are fed into a gear shift control circuit which computes an appropriate gear reduction ratio at all times and generates a corresponding command signal for changing the reduction ratio or shifting over a wide vehicle speed range, whenever necessary.

7 Claims, 2 Drawing Figures

ELECTRONIC CONTROL DEVICE FOR AUTOMATIC POWER TRANSMISSION

This invention relates to an electronic control device to be incorporated into an automatic power transmission which can be operated manually or automatically in accordance with selector lever position.

In the ordinary automatic power transmission, an anti-overspeed device is included for automatically effecting upshifts to prevent overspeeding of the engine if the selector lever is shifted from "D" to "II" "I" position during high speed travelling. This anti-overspeed device has a gear shift control circuit which is responsive to the shifting movement of the selector lever to operate the hydraulic control system in such a manner as to effect upshifts at predetermined vehicle speed levels higher than those during "D" position drive. A forced downshifting device is also provided in the automatic power transmission for automatically effecting downshifts to increase engine output torque if the operator depresses the accelerator pedal to full throttle position when the vehicle speed is moderate and high performance is needed for passing another vehicle or other purposes. This forced downshifting device also requires a gear shift control circuit which, responsively to the depression of the accelerator pedal, raises the vehicle speed levels at which downshifts are automatically effected. Furthermore, the transmission includes still another gear shift control circuit for determining the vehicle speed levels at which upshift and downshifts are effected during "D" position drive.

It is therefore an object of this invention to reduce the complexity of an electronic control device for an automatic power transmission by providing an improved gear shift control circuit which can vary the shifting speed in accordance with driving conditions of the vehicle so as to selectively prevent overspeeding of the engine or to increase engine output torque.

Figure 2:
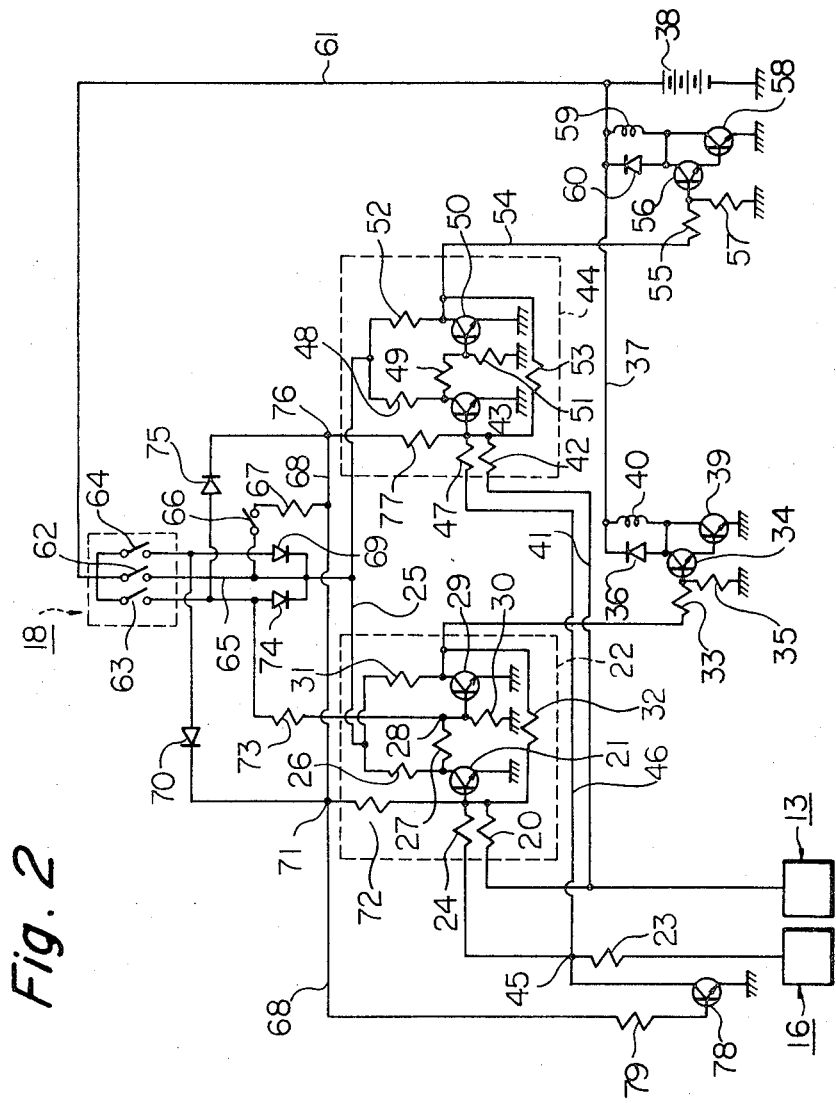

In the drawings:

FIG. 1 is a block diagram showing an electronic shift control device for an automatic power transmission embodying this invention; and FIG. 2 is a circuit diagram showing an example of the electronic shift control device of FIG. 1.

This invention will be described in greater detail in connection with an electronic control device to be incorporated into an automatic power transmission including gearing providing three forward drive ratios and one reverse ratio and having six selector positions, that is, P(parking), R(reverse), N(neutral), D(first, second and third forward drive ratios), II(second forward drive ratio locked) and I(first forward drive ratio locked). However, it is to be understood that this invention could equally well be applied to any type of an electronically controlled automatic power transmission.

Referring to FIG. 1, a preferred embodiment of the electronic shift control device of this invention is shown in block form. In the figure, a vehicle engine 10 is connected operatively to an automatic transmission 11 the power output portion of which is connected to an output shaft 12. A vehicle speed speed sensor 13 is provided for sensing revolutions of the output shaft 12 to generate a voltage proportional to vehicle speed. The voltage thus generated is supplied through a line 14 to an electronic control circuit 15. Another sensor 16 is provided for sensing throttle opening to generate a voltage proportional thereto, which voltage is also supplied to the electronic control circuit 15 through a line 17. Designated by reference numeral 18 is a selector position sensor for supplying to the electronic shift control circuit 15 an electric signal indicating the position of a manual selector lever (not shown). Further, the embodiment includes a kickdown sensor 19 mechanically linked with an accelerator pedal (not shown) to supply a kickdown voltage signal to the electronic control circuit 15.

The electronic control circuit 15 functions to determine reduction gear ratios appropriate for different driving conditions of the vehicle in response to the electric signal voltages from the vehicle speed sensor 13, throttle opening sensor 16, selector position sensor 18 and kickdown sensor 19 and, if the transmission is not in the proper gear ratio, to selectively energize or de-energize a plurality of solenoids in a manner to effect required shifting or gear change to the proper ratio as will be described in detail. Such shiftings are effected by a hydraulic control system having a plurality of shift valves (not shown) which cooperate with the solenoids, respectively, and which change their operative positions in response to energizing and de-energizing of the solenoids. Thus, the solenoids cooperating with the shift valves serve as actuating means for effecting shift between a plurality of gear ratios in the automatic power transmission.

FIG. 2 is a circuit diagram showing a preferred example of the present electronic control circuit.

The vehicle speed sensor 13 shown in block form is of a conventional type capable of producing a negative voltage the magnitude of which increases in proportion to the increase in vehicle speed. This negative voltage signal is supplied through a resistor 20 to the base of a transistor 21 which forms part of a first Schmidt Trigger circuit 22 electrically connected to a first solenoid cooperating with, for example, a first-second shift valve (not shown).

The throttle opening sensor 16 shown in block form also is of a conventional type and produces a positive voltage the magnitude of which increases as the throttle opening increases. This positive voltage signal is supplied through resistors 23 and 24 also to the base of the transistor 21.

The collector of transistor 21 is connected to a line 25 through a resistor 26 and its emitter to ground. The collector of the transistor 21 is connected through a resistor 27 to a point 28 leading to the base of a transistor 29. The point 28 is also grounded by way of a resistor 30. The emitter of transistor 29 is connected to ground and its collector to the line 25 through a resistor 31. The collector of the transistor 29 is connected through a resistor 32 to the base of the transistor 21 to provide a positive feedback.

The collector of the transistor 29 is also connected through a resistor 33 to the base of a transistor 34. The base of the transistor 34 is also grounded by way of a resistor 35. The collector of the transistor 34 is connected through a diode 36 to a bus line 37 leading to a source of d.c. voltage supply such as a battery 38 and the emitter is connected to the base of a transistor 39. The emitter of transistor 39 is grounded. The collectors of the transistors 34 and 39 are connected together to one end of the first solenoid 40 cooperating with the first-second shift solenoid valve (not shown). The coil 40 is connected at the other end to the bus line 37.

The vehicle speed signal is also supplied through a line 41 and a resistor 42 to the base of a transistor 43 which forms a second Schmidt Trigger circuit 44 electrically connected to a second solenoid cooperating with, for example, a second-third shift valve (not shown). The point 45 between the resistors 23 and 24 leading to the throttle opening sensor 16 is connected through a line 46 and a resistor 47 to the base of the transistor 43 to transmit the throttle opening signal to the second Schmidt Trigger circuit 44. The transistor 43 has its emitter grounded and its collector connected through a resistor 48 to the line 25. The collector of the transistor 43 is connected through a resistor 49 to the base of a transistor 50. The base of the transistor 50 is also grounded by way of a resistor 51 and the collector is connected through a resistor 52 to the line 25. Similarly, a positive feedback is provided by a resistor 53 connecting the collector of the transistor 50 to the base of the transistor 43.

The collector of the transistor 50 is connected through a line 54 and a resistor 55 to the base of a transistor 56 and grounded by way of a resistor 57. The emitter of the transistor 56 is connected to the base of a transistor 58 the emitter of which is grounded. The collector of transistor 58 is connected to one end of the second solenoid 59 cooperating with the second-third shift solenoid valve (not shown) and through a diode 60. The collector of the transistor 56 is also connected to the one end of the solenoid coil 59 and to the bus line 37 through the diode 60. The other end of the solenoid coil 59 is connected to the bus line 37.

The battery 38 is connected through a line 61 to the selector position sensor 18 which comprises three switches 62, 63 and 64 corresponding to "D," "II" and "I" selector positions, respectively. These switches are operatively associated with the selector lever (not shown) in such a manner as to be closed when the selector lever is shifted to the corresponding position. The "D" position switch 62 is connected through a line 65 to the line 25 which serves as a bus line for the first and second Schmidt Trigger circuit 22 and 44. Connected to the line 65 is the kickdown sensor 19 comprising a switch 66 adapted to be closed when the operator depresses the accelerator pedal 100 percent for quick acceleration. The kickdown switch 66 is connected through a resistor 67 to a line 68. The "I" position switch 64 is connected through a diode 69 to the bus line 25. It is also connected through a diode 70 to a point or node 71 on the line 68. The point or node 71 is connected through a resistor 72 to the base of the transistor 21 of the first Schmidt Trigger circuit 22. Further, the "II" position switch 63 is connected through a resistor 73 to the base of the transistor 29 of the first Schmidt Trigger circuit 22. The "II" position switch 63 is connected through a diode 74 to bus line 25. It is also connected through a diode 75 to a point or node 76 on the line 68, which leads through a resistor 77 to the base of the transistor 43 of the second Schmidt Trigger circuit 44. The line 68 is also connected through a resistor 79 to the base of a transistor 78. The emitter of transistor 78 is connected to the ground and its collector to the point or node 45 leading through the resistor 24 to the base of the transistor 21.

The electronic control circuit 15 according to this invention operates as follows:

When the selector lever is in the "D" position, the switch 62 is closed and a positive voltage is supplied through lines 61 and 65 to the bus line 25 of the first second Schmidt Trigger circuits 22 and 44. Under this condition, as the accelerator pedal is depressed, the vehicle starts to move and the speed to increase. During low speeds, the transistor 21 is kept conducting, since the negative voltage indicating vehicle speed and supplied to the transistor 21 through the resistor 20 is not sufficiently large to override the positive voltage indicating throttle opening and supplied to the same transistor 21 through the resistors 23 and 24 and a positive feedback voltage supplied to the same transistor 21 through the resistor 32. With the transistor 21 kept conducting, the transistor 29 is non-conducting, so that a positive voltage appearing on the collector of the transistor 29 is supplied through the resistor 33 to the transistor 34. This positive voltage renders the transistor 34 and accordingly the transistor 39 conducting, establishing a current path from the bus line 37 to ground through the solenoid 40 and the transistor 39. Consequently, the first-second shift valve (not shown) cooperating with the solenoid 40 is actuated. The resistance values of the resistors 20, 23, 24 and 32 are so selected that the transistor 21 is rendered non-conducting when the vehicle speed exceeds a predetermined value (which will be hereinafter referred to as "first-second upshift speed"). When the "first-second upshift speed" has been reached, the transistor 21 is rendered non-conducting and accordingly the transistor 29 is rendered conductive. This will render the transistors 34 and 39 non-conducting to de-actuate the first-second shift valve.

With the transistor 29 kept conducting, there is no positive voltage fed back to the base of the transistor 21 through the feedback resistor 32. Thus, it is when the vehicle speed decreases to a predetermined value lower than the "first-second upshift speed" that the transistor 21 returns to its conducting state. At this time the first-second shift valve (not shown) is again actuated to effect a shifting to the first speed ratio. The predetermined vehicle speed will be hereinafter referred to as "second-first downshift speed."

The resistance values of the resistors 23, 42, 47 and 53 are so adjusted that the transistor 43 is rendered non-conducting when the vehicle speed exceeds a predetermined speed (which will be hereinafter referred to as "second-third upshift speed") which is higher than the "first-second upshift speed." As will be understood from the circuit diagram of FIG. 2, the second Schmidt Trigger circuit 44 is similar in construction and operation to that of the first Schmidt Trigger circuit 22 except that the transistor 43 of the second Schmidt Trigger circuit 44 is rendered non-conducting at a higher vehicle speed than the transistor 21 of the first Schmidt Trigger circuit 22. Hence, when the second-third upshift speed has been reached, the second-third shift valve (not shown) associated with the solenoid coil 59 is de-actuated. Similarly, the vehicle speed at which a shifting from third to second speed ratio is effected (which will be hereinafter referred to as "third-second down-shift speed") is lower than the "second-third upshift speed" because of the feedback resistor 53. It is to be understood that as throttle opening increases by further depressing the accelerator pedal, the positive voltages supplied to the bases of the transistors 21 and 43 by the throttle opening sensor 16 increase with the result that the shifting points at which upshifts and downshifts are effected move to higher vehicle speed levels.

It is to be noted, in this instance, that during "D" position drive when both the first-second shift valve solenoid and the second-third shift valve solenoid are energized a first forward speed ratio is established in the automatic transmission, that if only the second-third shift valve solenoid is energized a second forward speed ratio is established, and that if neither the first-second shift valve solenoid nor the second-third shift valve solenoid is energized a third forward speed ratio is established.

In the case where passing is desired by the operator, he would depress the accelerator pedal to full-throttle position to have the motor vehicle increase in speed. The depression of the accelerator pedal actuates the kickdown sensor 19 to close the switch 66. Closure of the kickdown switch 66 connects the line 65 to the line 68 through the resistor 67 and accordingly applies a positive voltage to the base of the transistor 78. Consequently, the transistor 78 is rendered conducting to connect the point 45 directly to ground, thereby cutting off the throttle opening indicating positive voltage to the transistor 21. However, at this time, a positive voltage of a constant magnitude appearing on the line 68 is supplied through the resistor 72 to the transistor 21. Thus, the transistor 21 is rendered non-conducting when the vehicle speed increases to such a value that the vehicle speed indicating negative voltage overrides the positive feedback voltage and the constant positive voltage supplied to the transistor 21 through the resistors 67 and 72. The resistors 20, 32, 72 and 67 are so selected that the transistor 21 is rendered conductive when the vehicle speed exceeds a predetermined value higher than the "first-second upshift speed." The predetermined vehicle speed will be hereinafter referred to as "kickdown first-second upshift speed." Similarly to the first Schmidt Trigger circuit 22, the transistor 43 of the second Schmidt Trigger circuit 44 can be rendered non-conducting at a predetermined value (which will be hereinafter referred to as "kickdown second-third upshift speed") which is higher than the "second-third upshift speed," by properly adjusting the values of the resistors 42, 53, 77 and 67. With this arrangement, if acceleration is desired when the vehicle is travelling at speeds higher the "first-second upshift speed" but lower than the "kickdown first-second upshift speed," a downshift to the first speed ratio is effected in response to kickdown. Further, if the kickdown is made at speeds higher than the second-third upshift speed but lower than the "kickdown second-third upshift speed," a downshift to the second speed ratio is effected. When downshift occurs, the acceleration increases, enabling the operator to pass another vehicle ahead with increased safety.

Another function of the present electronic control circuit 15 is to prevent the engine from overspeeding if the selector lever is manually shifted from "D" to "II" or "I" position when the vehicle is travelling at high speeds. If the selector lever is moved to "II" position, the switch 62 is opened and simultaneously the switch 63 is closed to connect the battery 38 to the bus line 25 through the diode 74. At this time, a positive voltage is supplied to the base of the transistor 29 of the first Schmidt Trigger circuit 22 through the resistor 73, rendering the transistor 29 conducting irrespective of vehicle speed and throttle opening. As a result, the first-second shift solenoid valve is de-actuated.

With the selector lever in the "II" position, the line 61 is connected through the switch 63 and the diode 75 to the line 68, so that a positive voltage is supplied through the resistor 77 to the transistor 78, thereby rendering it conductive as is the case when kickdown is effected. This prevents the throttle opening indicating positive signal from being supplied to the transistors 21 and 43. Thus, in this case, the vehicle speed level at which a shifting to the third speed ratio is effected (which will be hereinafter referred to as "manual control second-third upshift speed") is higher than the "second-third upshift speed." Since there is no interposing resistor such as the resistor 67 between the switch 63 and the line 68, the "manual control second-third upshift speed" is still higher than the "kickdown second-third upshift speed." With this arrangement, if the selector lever is manually shifted down to "II" position when the vehicle is travelling at speeds higher than the "manual control second-third upshift speed," a shifting to the third speed ratio is automatically effected in the automatic transmission preventing the engine from overspeeding.

On the other hand, when the selector lever is manually moved from "D" to "I" position, the switch 64 is closed to connect the battery 38 to the bus line 25 through the diode 69. Further, the battery 38 is connected through the diode 70 to the line 68, applying a positive voltage to the transistor 78 to render it conducting. As a result, the throttle opening indicating positive voltage is cancelled and in the place of the voltage the positive voltage on the line 68 is applied to the base of the transistor 21. This will raise the vehicle speed level at which the transistor 29 is rendered non-conducting to a level dependent upon the resistance values of the resistors 20, 32 and 72. The predetermined vehicle speed will be hereinafter referred to as "manual control first-second upshift speed." Thus, if the selector lever is shifted down from "D" to "I" position when the vehicle is travelling at speeds higher than the "manual control first-second upshift speed," a shifting is automatically effected to the second speed ratio, preventing the engine from overspeeding.

I claim:

1. An electronic control device for an automatic power transmission of a motor vehicle, comprising, in combination:

first sensing means for generating a first variable voltage signal proportional to vehicle speed;

second sensing means for generating a second variable voltage signal proportional to throttle opening;

third sensing means for generating first, second and third constant voltage signals representing "D," "II" and "I" positions of a selector lever, respectively;

fourth sensing means for generating a fourth constant voltage signal when an accelerator pedal is depressed to full throttle position for quick acceleration;

circuit means having comparing means connected to said first, second, third and fourth sensing means, said comparing means being responsive to said first constant voltage signal and comparing said first and second variable voltage signals to produce a first control signal until the sum of said first and second variable voltage signals exceeds a first predetermined value, a second control signal when the sum of said first and second varable voltage signals exceeds the first predetermined value and a third control signal when the sum of said first and second variable voltage signals exceeds a second predetermined value, said comparing means being responsive to said second constant voltage signal and comparing said second constant voltage signal with said first variable voltage signal to produce said second control signal when the sum of said second constant voltage signal and said first variable voltage signal exceeds said first predetermined value, said comparing being responsive to said third constant voltage signal and comparing said third constant voltage signal with said first variable voltage signal to produce said first control signal when the sum of said third constant voltage signal and said first variable voltage signal is below said first predetermined level, and said comparing means being responsive to said fourth constant voltage signal and comparing said fourth constant voltage signal with said first variable voltage signal to produce a forced-downshift signal; and actuating means connected to said circuit means for effecting shift between a plurality of gear ratios in said automatic power transmission in response to said first, second and third control signals and said forced-downshift signal.

2. An electronic control device for an automatic power transmission of a motor vehicle, comprising, in combination:

first sensing means for generating a variable negative voltage signal proportional to vehicle speed;

second sensing means for generating a variable positive voltage signal proportional to throttle opening;

third sensing means for generating first, second and third constant positive voltage signals representing "D," "II" and "I" positions of a selector lever, respectively;

fourth sensing means for generating a fourth constant positive voltage signal when an accelerator pedal is depressed to full throttle position for quick acceleration;

circuit means having comparing means connected to said first, second, third and fourth sensing means, said comparing means being responsive to said first constant positive voltage signal and comparing said variable negative voltage signal with said variable positive voltage signal to produce a first control signal when the sum of said variable negative and positive voltage signals is below a first predetermined value, a second control signal when the sum of said variable negative and positive voltage signals exceeds the first predetermined value and a third control signal when the sum of said variable negative and positive voltage signals exceeds a second predetermined value, said comparing means being responsive to said second constant positive voltage signal and comparing said second constant positive voltage signal with said variable negative voltage signal to produce said second control signal when the sum of said second constant positive voltage signal and said variable negative voltage signal exceeds said first predetermined value, said comparing means being responsive to said third constant positive voltage signal and comparing said third constant positive voltage signal with said variable negative voltage signal to produce said first control signal when the sum of said third constant positive voltage signal and said variable negative voltage is below said first predetermined level, and said comparing means being responsive to said fourth constant positive voltage signal and comparing said fourth constant positive voltage signal with said variable negative voltage signal to produce a forced-downshift signal; and actuating means connected to said circuit means for effecting shift between a plurality of gear ratios in said automatic power transmission in response to said first, second and third control signals and said forced-downshift signal.

3. An electronic control device for an automatic power transmission of a motor vehicle, comprising, in combination:

a vehicle speed sensor for generating a variable negative voltage signal proportional to vehicle speed;

a throttle opening sensor for generating a variable positive voltage signal proportional to throttle opening;

a selector lever position sensor for generating first, second and third constant positive voltage signals representing "D," "II" and "I" positions of a selector lever, respectively;

a kick-down sensor for generating a fourth constant positive voltage signal when an accelerator pedal is depressed to full throttle position for quick acceleration;

switching means connected to said throttle sensor and controlled by said second, third and fourth constant positive voltage signals from said selector lever position sensor and said kick-down sensor to cut-off said variable positive voltage signal from said throttle sensor;

circuit means having comparing means connected to said vehicle speed sensor, said throttle opening sensor, said selector lever position sensor and said kick-down sensor, said comparing means being responsive to said first constant positive voltage signal and comparing said variable negative voltage signal with said variable positive voltage signal to produce a first control signal when the sum of said variable negative and positive voltage signals is below a first predetermined value, a second control signal when the sum of said variable negative and positive voltage signals exceeds the first predetermined value and a third control signal when the sum of said variable negative and positive voltage signals exceeds a second predetermined value, said comparing means being responsive to said second constant positive voltage signal and comparing said second constant positive voltage signal with said variable negative voltage signal to produce said second control signal when the sum of said second constant positive voltage signal and said variable negative voltage signal exceeds said first predetermined value, said comparing means being responsive to said third constant positive voltage signal and comparing said third constant positive voltage signal with said variable negative voltage signal to produce said first control signal when the sum of said third constant positive voltage signal and said variable negative voltage signal is below said first predetermined level, and said comparing means being responsive to said fourth constant positive voltage signal and comparing said fourth constant positive voltage signal with said variable negative voltage signal to produce a forced-downshift signal; and actuating means connected to said circuit means for effecting shift between a plurality of gear ratios in said automatic power transmission in response to said first, second and third control signals and said forced-downshift signal.

4. In an automatic power transmission of a motor vehicle, and electronic control device for controlling shift between different gear ratios in said automatic power transmission, said electronic control device comprising, in combination:

a vehicle speed sensor for generating a variable negative voltage signal proportional to vehicle speed;

a throttle opening sensor for generating a variable positive voltage signal proportional to throttle opening;

a selector lever position sensor for generating first, second and third constant positive voltage signals representing "D," "II" and "I" positions of a selector lever, respectively:

a kick-down sensor for generating a fourth constant positive voltage signal when an accelerator pedal is depressed to full throttle position for quick acceleration;

a switching transistor having its base connected to said selector lever position sensor and said kick-down sensor and having its collector connected to said throttle opening sensor, the emitter of said switching transistor being grounded, said switching transistor being rendered conductive to cut-off said variable positive voltage signal from said throttle opening sensor in response to one of said second, third and fourth constant positive voltage signals from said selector position sensor and said kick-down sensor;

first trigger circuit connected to said vehicle speed sensor and said throttle opening sensor and connected to said selector lever position sensor and said kick-down sensor;

second trigger circuit connected to said vehicle speed sensor and said throttle opening sensor and connected to said selector lever position sensor and said kick-down sensor;

said first and second trigger circuits cooperating with each other, said first and second trigger circuits being responsive to said first constant positive voltage signal and comparing said variable positive voltage signal with said variable negative voltage signal to generate a first control signal when the sum of said variable negative voltage signal and said variable positive voltage signal is below a first predetermined value, said first and second trigger circuits being responsive to said second constant positive voltage signal sensor and comparing said variable negative voltage signal with said second constant positive voltage signal to generate a second control signal when the sum of said second constant positive voltage signal and said variable negative voltage signal exceeds said first predetermined value, said first and second trigger circuits being responsive to said third constant positive voltage signal and comparing said variable negative voltage signal with said third constant positive voltage signal to generate a third control signal when the sum of said third constant positive voltage signal and said variable negative voltage signal exceeds a second predetermined value, and said first and second trigger circuit being responsive to said fourth constant positive voltage signal and comparing said variable negative voltage signal with said fourth constant positive voltage signal to generate a forced-downshift signal; and actuating means including first and second solenoids connected to said first and second trigger circuits, respectively, said first and second solenoids being selectively energized and de-energized in response to said first, second and third control signals and said forced-downshift signal for controlling shift between said gear ratios in said automatic power transmission.

5. In an automatic power transmission of a motor vehicle, and electronic control device for controlling shift between different gear ratios in said automatic power transmission, said electronic control device comprising, in combination:

a vehicle speed sensor for generating a variable negative voltage signal proportional to vehicle speed;

a throttle opening sensor for generating a variable positive voltage signal proportional to throttle opening;

a selector lever position sensor having first, second and third switches generating first, second and third constant positive voltage signals, when closed, representing "D," "II" and "I" positions of a selector lever, respectively; a kick-down sensor for generating a fourth constant positive voltage signal when an accelerator pedal is depressed to full throttle position for quick acceleration;

a switching transistor having its base connected to said selector lever position sensor and said kick-down sensor and having its collector connected to said throttle opening sensor, the emitter of said switching transistor being grounded, said switching transistor being rendered conductive to cut-off said variable positive voltage signal from said throttle opening sensor in response to one of said second, third and fourth constant positive voltage signals from said selector lever position sensor and said kick-down sensor;

first trigger circuit including an input connected to said vehicle speed sensor, said throttle opening sensor, and said first, second and third switches of said selector lever position sensor and said kick-down sensor, an output, and two cascaded transistors connected between said input and output;

second trigger circuit including an input connected to said vehicle speed sensor, said throttle opening sensor, said first second and third switches of said selector lever position sensor and said kick-down sensor, an output, and two cascaded transistors connected between said input and output;

said first and second trigger circuits cooperating with each other, said first and second trigger circuits being responsive to said first constant positive voltage signal and comparing variable positive voltage signal with said variable negative voltage signal to generate a first control signal when the sum of said variable negative voltage signal and said variable positive voltage signal is below a first predetermined value, said first and second trigger circuits being responsive to said second constant positive voltage signal sensor and comparing said variable negative signal with said second constant positive voltage signal to generate a second control signal when the sum of said second constant positive voltage signal and said variable negative voltage signal exceeds said first predetermined value, said first and second trigger circuits being responsive to said third constant positive voltage signal and comparing said variable negative voltage signal with said third constant positive voltage signal to generate a third control signal when the sum of said third constant positive voltage signal and said variable negative voltage signal exceeds a second predetermined value, and said first and second trigger circuit being responsive to said fourth constant positive voltage signal and comparing said variable negative voltage signal with said fourth constant positive voltage signal to generate a forced-downshift signal; and actuating means including first and second solenoids connected to the outputs of said first and second trigger circuits, respectively, said first and second solenoids being selectively energized and de-energized in response to said first, and second and third control signals and said forced-downshift signal for controlling shift between said gear ratios in said automatic power transmission.

6. In an automatic power transmission of a motor vehicle, an electronic control device for controlling shift between different gear ratios in said automatic power transmission, said electronic control device comprising, in combination:

a vehicle speed sensor for generating a variable negative voltage signal proportional to vehicle speed;

a throttle opening sensor for generating a variable positive voltage signal proportional to throttle opening;

a selector lever position sensor having first, second and third switches generating first, second and third constant positive voltage signals, when closed, representing "D," "II" and "I" positions of a selector lever, respectively;

a kick-down sensor for generating a fourth constant positive voltage signal when an accelerator pedal is depressed to full throttle position for quick acceleration;

a switching transistor having its base connected to said selector lever position sensor and said kick-down sensor and having its collector connected to said throttle opening sensor, the emitter of said switching transistor being grounded, said switching transistor being rendered conductive to cut-off said variable positive voltage signal from said throttle opening sensor in response to one of said second, third and fourth constant positive voltage signals from said selector position sensor and said kick-down sensor;

first trigger circuit including an input connected to said vehicle speed sensor said throttle opening sensor, said first, second and third switches of said selector lever position sensor and said kick-down sensor, an output, two cascaded transistors connected between said input and output, and a feed-back circuit interconnecting said input and output and having resistor means;

second trigger circuit including an input connected to said vehicle speed sensor, said throttle opening sensor and said first, second and third switches of said selector lever position sensor and said kick-down sensor, an output, two cascaded transistors connected between said input and output, and a feed-back circuit interconnecting said input and output and having resistor means said first and second trigger circuits cooperating with each other, said first and second trigger circuits being responsive to said first constant positive voltage signal and comparing said variable positive voltage signal with said variable negative voltage signal to generate a first control signal when the sum of said variable negative voltage signal and said variable positive voltage signal is below a first predetermined value, said first and second trigger circuits being responsive to said second constant positive voltage signal sensor and comparing said variable negative voltage signal with said second constant positive voltage signal to generate a second control signal when the sum of said second constant positive voltage signal and said variable negative voltage signal exceeds said first predetermined value, said first and second trigger circuits being responsive to said third constant positive voltage signal and comparing said variable negative voltage signal with said third constant positive voltage signal to generate a third control signal when the sum of said third constant positive voltage signal and said variable negative voltage signal exceeds a second predetermined value, and said first and second trigger circuits being responsive to said fourth constant positive voltage signal and comparing said variable negative voltage signal with said fourth constant positive voltage signal to generate a forced-downshift signal; and actuating means including first and second solenoids connected to the outputs of said first and second trigger circuits, respectively, said first and second solenoids being selectively energized and de-energized in response to said first, second and third control signals and said forced-downshift signal for controlling shift between said gear ratios in said automatic power transmission.

7. In an automatic power transmission of motor vehicle, an electronic control device for controlling shift between different gear ratios in said automatic power transmission, said electronic control device comprising, in combination:

a vehicle speed sensor for generating a variable negative voltage signal proportion to vehicle speed;

a throttle opening sensor for generating a variable positive voltage signal proportional to throttle opening;

a selector lever position sensor having first, second and third switches generating first, second and third constant positive voltage signals, when closed, representing "D," "II" and "I" positions of a selector lever, respectively;

a kick-down sensor for generating a fourth constant positive voltage signal when an accelerator pedal is depressed to full throttle position for quick acceleration;

a switching transistor having its base connected to said selector lever position sensor and said kick-down sensor and having its collector connected to said throttle opening sensor, the emitter of said switching transistor being grounded, said switching transistor being rendered conductive to cut-off said variable positive voltage signal from said throttle opening sensor in response to one of said second, third and fourth constant positive voltage signals from said selector position sensor an said kick-down sensor;

first resistor means connected to said kick-down sensor;

first trigger circuit including an input, and an output, second resistor means, two cascaded transistors connected between said input and output, and a first feed-back circuit having a resistor and interconnecting said input and output, said input being connected to said first switch of said selector lever position sensor, to said second and third switches of said selector lever position sensor through said second resistor means, and to said kick-down sensor through said first and second resistor means;

second trigger circuit including an input, an output, third resistor means, two cascaded transistor connected between said input and output, and a feedback circuit having a resistor and interconnecting said input and output, said input being connected to said first switch of said selector lever position sensor, to said second and third switches of said selector lever position sensor through said third resistor means, and to said kick-down sensor through said first and third resistor means;

said first and second trigger circuits cooperating with each other, said first and second trigger circuits being responsive to said first constant positive voltage signal and comparing said variable positive voltage signal with said variable negative voltage signal to generate a first control signal when the sum of said variable negative voltage signal and said variable positive voltage signal is below a first predetermined value, said first and second trigger circuits being responsive to said second constant positive voltage signal sensor and comparing said variable negative voltage signal with said second constant positive voltage signal to generate a second control signal when the sum of said second constant positive voltage signal and said variable negative voltage signal exceeds said first predetermined value, said first and second trigger circuits being responsive to said third constant positive voltage signal and comparing said variable negative voltage signal with said third constant positive voltage signal to generate a third control signal when the sum of said third constant positive voltage signal and said variable negative voltage signal exceeds a second predetermined value, and said first and second trigger circuit being responsive to said fourth constant positive voltage signal and comparing said variable negative voltage signal with said fourth constant positive voltage signal to generate a forced-down shift signal and actuating means including first and second solenoids connected to the outputs of said first and second trigger circuits, respectively, said first and second solenoids being selectively energized and de-energized in response to said first, second and third control signals and said forced-downshift signal for controlling shift between said gear ratios in said automatic power transmission.

* * * * *